(12) United States Patent
Song et al.

(10) Patent No.: US 9,596,464 B2
(45) Date of Patent: Mar. 14, 2017

(54) METHOD AND DEVICE FOR ENCODING AND DECODING BY USING PARALLEL INTRAPREDICTION BY A CODING UNIT

(71) Applicant: SK TELECOM CO., LTD., Seoul (KR)

(72) Inventors: Jinhan Song, Seoul (KR); Jeongyeon Lim, Seongnam-si (KR); Yung Ho Choi, Anyang Si (KR); Yonggoo Kim, Seoul (KR); Yoonsik Choe, Goyang-si (KR)

(73) Assignee: SK TELECOM CO., LTD., Seoul (KR)

( * ) Notice: Subject to any disclaimer, the term of this patent is extended or adjusted under 35 U.S.C. 154(b) by 871 days.

(21) Appl. No.: 13/935,067

(22) Filed: Jul. 3, 2013

(65) Prior Publication Data

US 2013/0294508 A1 Nov. 7, 2013

Related U.S. Application Data

(63) Continuation of application No. PCT/KR2012/000089, filed on Jan. 4, 2012.

(30) Foreign Application Priority Data

Jan. 4, 2011 (KR) .................. 10-2011-0000342

(51) Int. Cl.
*H04N 19/00* (2014.01)
*H04N 19/50* (2014.01)
(Continued)

(52) U.S. Cl.
CPC ..... *H04N 19/00569* (2013.01); *H04N 19/105* (2014.11); *H04N 19/157* (2014.11);
(Continued)

(58) Field of Classification Search
CPC .......... H04N 19/00569; H04N 19/105; H04N 19/157; H04N 19/182; H04N 19/436; H04N 19/593
See application file for complete search history.

(56) References Cited

U.S. PATENT DOCUMENTS

2006/0222066 A1* 10/2006 Yoo ................. H04N 19/147
375/240.03
2007/0253483 A1* 11/2007 Lee ................. H04N 19/176
375/240.12

(Continued)

FOREIGN PATENT DOCUMENTS

| KR | 1020060111734 | 10/2006 |
|---|---|---|
| KR | 1020100002261 | 1/2010 |
| KR | 1020100081984 | 7/2010 |

OTHER PUBLICATIONS

Liu, Yu. "Analysis of Coding Tools in HEVC Test Model (HM 1.0) Intra Prediction." H265.net. Dec. 1, 2010. http://web.archive.org/web/20160305182245/http://www.h265.net/2010/12/analysis-of-coding-tools-in-hevc-test-model-hm-intra-prediction.html. Oct. 18, 2016.*

(Continued)

*Primary Examiner* — Behrooz Senfi
*Assistant Examiner* — Maria Vazquez Colon
(74) *Attorney, Agent, or Firm* — Hauptman Ham, LLP (57) ABSTRACT

A video encoding apparatus, a video decoding apparatus and method by using parallel intra-prediction by a coding unit-level are provided. The video encoding apparatus includes a left extrapolation pixel generating unit for generating left extrapolation pixels for a coding unit by using at least one of pixels of a top left block of the coding unit according to a direction of an intra-prediction mode with respect to the coding unit and leftmost original pixels of the coding unit; an intra-prediction encoding unit for predicting the coding (Continued)

unit by using neighboring pixels including the left extrapolation pixels to generate a first prediction block and encode the coding unit; and a prediction information encoding unit for encoding prediction information including the intra-prediction mode.

21 Claims, 10 Drawing Sheets

(51) Int. Cl.
*H04N 19/105* (2014.01)
*H04N 19/593* (2014.01)
*H04N 19/157* (2014.01)
*H04N 19/182* (2014.01)
*H04N 19/436* (2014.01)

(52) U.S. Cl.
CPC ......... *H04N 19/182* (2014.11); *H04N 19/436* (2014.11); *H04N 19/593* (2014.11)

(56) References Cited

U.S. PATENT DOCUMENTS

2010/0195722 A1* 8/2010 Boon ............... H04N 19/00042
375/240.12
2010/0260263 A1* 10/2010 Kotaka ............ H04N 19/00175
375/240.15

OTHER PUBLICATIONS

International Search Report mailed Sep. 24, 2012 for PCT/KR2011/000089 citing the above reference(s).

* cited by examiner

--Prior Art--

METHOD AND DEVICE FOR ENCODING AND DECODING BY USING PARALLEL INTRAPREDICTION BY A CODING UNIT

CROSS-REFERENCE TO RELATED APPLICATION

The instant application is a continuation of International Patent Application No. PCT/KR2012/000089, filed Jan. 4, 2012, which is based on and claims priority to Korean Patent Application No. 10-2011-0000342, filed on Jan. 4, 2011. The disclosures of the above-listed applications are hereby incorporated by reference herein in their entirety.

TECHNICAL FIELD

The present disclosure relates to a method and apparatus for encoding and decoding by using parallel intra-prediction by a coding unit-level, and more particularly, capable of simultaneously performing intra prediction coding of a plurality of coding unit blocks by utilizing partial pixel data of an original image and previously reconstructed block pixel information.

BACKGROUND

The statements in this section merely provide background information related to the present disclosure and may not constitute prior art.

In a video data compression apparatus, intra encoding is performed by efficiently compressing residual signals, which are obtained by an efficient removal of a spatial redundancy in a frame or a block, through a transform technique, a quantization and an entropy coding process.

A typical intra encoding method includes an intra encoding technique through directionality-based extrapolation prediction of H.264/AVC.

Figure 1:
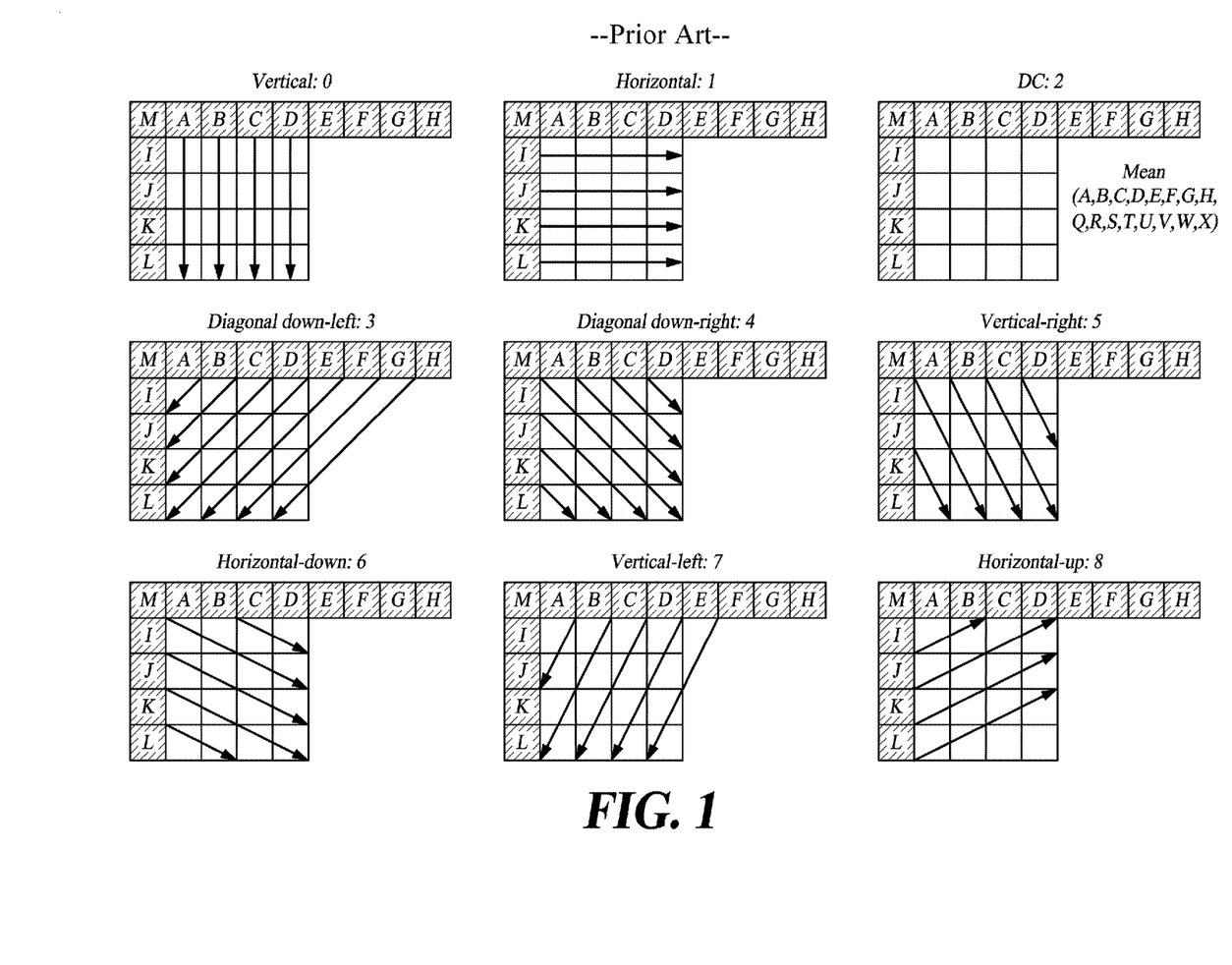
FIG. 1 is an exemplary view of an intra 4×4 prediction mode of H.264/AVC.

The intra encoding through the directionality-based prediction of the H.264/AVC performs an extrapolation prediction by using left and upper pixels (A to M), which are previously encoded and decoded based on nine directions including a direct current or DC prediction (mode 2) as shown in FIG. 1. In other words, the extrapolation prediction can be performed in a manner that one pixel value in the block is filled by left and upper pixel values taken in a prediction direction. For example, in case of mode 0, since the extrapolation prediction is performed in a vertical direction, a 4×4 block of FIG. 1 has values filled with values A, B, C and D of the upper pixels in an arrow direction.

In recent times, in order to support ultra-high resolution, intra prediction methods have been proposed to use various directions and various block sizes. The inventor(s) has, however, noted that in these methods, in order to reflect a more precise texture direction in the prediction, a larger number of prediction modes should be calculated, and in particular, in order to process a large video having a high resolution, lengthy time is needed. The inventor(s) has noted that in addition, in these methods, as encoding and decoding results of the current block are used for the following block encoding and decoding, parallel processes of the encoding and decoding become difficult. That is, the inventor(s) has experienced that in order to decode the current block, reconstructed pixels of an upper block and a left block of the current block are needed, which holds encoding pixels of the current block until completion of the reconstruction of the previous block.

A technical solution has been proposed to provide a sub block level parallelism in a macro block. However, the inventor(s) has experienced that since the parallelism at best has a subsidiary block shape within the framework of the macro block, the parallelism cannot be easily implemented under current multidivisional structures. The inventor(s) has, further, experienced that as pixel values far from the current subsidiary block are used as extrapolation prediction values, compression efficiency will be reduced. The inventor(s) has noted that this brings a limiting factor to the video encoding and decoding through a parallel processing system of the state-of-the-art multi-core processor and graphic processing unit (GPU).

SUMMARY

In accordance with some embodiments of the present disclosure, a video encoding apparatus comprises a left extrapolation pixel generating unit, an intra-prediction encoding unit, and a prediction information encoding unit. The left extrapolation pixel generating unit is configured to generate left extrapolation pixels for a coding unit by using one selected from the group consisting of pixels of a top left block of the coding unit according to a direction of an intra-prediction mode with respect to the coding unit, and leftmost original pixels of the coding unit. The intra-prediction encoding unit is configured to predict the coding unit by using neighboring pixels including the left extrapolation pixels to generate a first prediction block to encode the coding unit. And the prediction information encoding unit is configured to encode prediction information including the intra-prediction mode.

In accordance with some embodiments of the present disclosure, video decoding apparatus comprises a prediction information decoding unit, a left extrapolation pixel generating unit, and an intra-prediction decoding unit. The prediction information decoding unit is configured to decode prediction information including an intra-prediction mode. The left extrapolation pixel generating unit is configured to generate left extrapolation pixels of a coding unit to be reconstructed by using one of pixels of a top left block of the coding unit according to a direction of the intra-prediction mode and leftmost original pixels of the coding unit included in the decoded prediction information. And the intra-prediction decoding unit is configured to generate a first prediction block of the coding unit and reconstruct the coding unit by using neighboring pixels of the coding unit according to the intra-prediction mode in the decoded prediction information.

In accordance with some embodiments of the present disclosure, video decoding apparatus performs to decode prediction information including an intra-prediction mode; to generate left extrapolation pixels of a coding unit to reconstruct by using one of pixels of a top left block of the coding unit according to a direction of the decoded intra-prediction mode and leftmost original pixels of the coding unit included in the decoded prediction information; and to generate a first prediction block of the coding unit and reconstructing the coding unit by using neighboring pixels of the coding unit according to the intra-prediction mode in the decoded prediction information.

DETAILED DESCRIPTION

The present disclosure provides an enhanced encoding/decoding efficiency by improving the parallelism of video data compression and reconstruction techniques to simultaneously perform intra prediction coding operations of a plurality of coding unit blocks by utilizing partial pixel data of the original image and previously reconstructed block pixel information in encoding or decoding of a video.

A video encoding apparatus and/or a video decoding apparatus, which is to be described below, may be a user terminal such as a personal computer (PC), a notebook computer, a personal digital assistant (PDA), a portable multimedia player (PMP), a play station portable (PSP), a wireless communication terminal, a smart phone, a TV, or the like. A video encoding apparatus and/or a video decoding apparatus according to one or more embodiments may be a server terminal such as an application server, a service server, or the like. A video encoding apparatus and/or a video decoding apparatus according to one or more embodiments may be various apparatuses each including (a) a communication device such as a communication modem and the like configured to perform communication with various types of devices or a wired/wireless communication networks, (b) a memory configured to store various programs and data that encode or decode a video or perform inter or intra prediction for encoding and decoding and (c) a microprocessor or the like configured to execute a program so as to perform calculation and controlling, and the like.

In addition, a video encoded into a bitstream by a video encoding apparatus is transmitted to a video decoding apparatus through a wired/wireless communication network such as the Internet, a short range wireless communication network, a wireless LAN network, a WiBro (wireless broadband, aka WiMax) network, a mobile communication network, or the like, or through various communication interfaces such as a cable, a universal serial bus (USB) and the like. According to one or more embodiments, the bitstream may be decoded in the video decoding apparatus and may be reconstructed to a video, and the video may be played back.

A video may be a series of pictures, and each picture may be divided into predetermined domains such as frames or blocks. When a domain of the video is divided into blocks, the divided blocks may be classified into intra blocks and inter blocks according to an encoding method. The intra block is a block encoded through intra prediction coding. The intra prediction coding is a method of generating a prediction block by predicting a pixel of the current block by using pixels of the blocks reconstructed through encoding and decoding in the current picture in which the current encoding is performed, and encoding a difference value with respect to the pixel of the current block. The inter block is a block encoded through inter prediction coding. The inter prediction coding is a method of generating prediction block by predicting the current block in the current picture with reference to at least one past picture or future picture, and encoding a difference value with respect to the current block. Here, a frame referenced to encode or decode the current picture is referred to as a reference frame.

Figure 2:
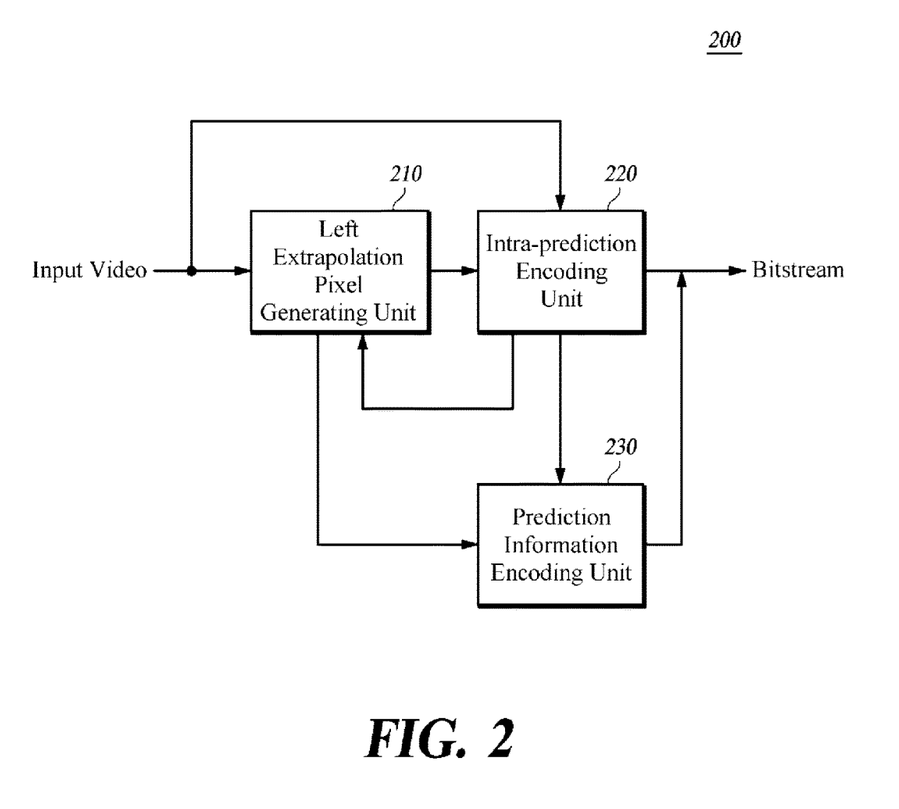
FIG. 2 is a schematic block diagram of a video encoding apparatus according to at least one embodiment of the present disclosure.

FIG. 2 is a schematic block diagram of a video encoding apparatus according to at least one embodiment of the present disclosure.

A video encoding apparatus 200 according to the at least one embodiment of the present disclosure includes a left extrapolation pixel generating unit 210, an intra-prediction encoding unit 220 and a prediction information encoding unit 230.

The left extrapolation pixel generating unit 210 generates at least one left extrapolation pixel of a coding unit (i.e., current block) by using one selected from the group consisting of pixels of a top left block of the coding unit and the leftmost original pixels of the coding unit according to a direction of an intra-prediction mode with respect to the current block.

The intra-prediction encoding unit 220 predicts and encodes the coding unit by using at least one neighboring pixel including left extrapolation pixels generated in the left extrapolation pixel generating unit 210.

The prediction information encoding unit 230 encodes prediction information including a prediction mode (i.e., an intra prediction mode) in which intra-prediction was performed.

Figure 3:
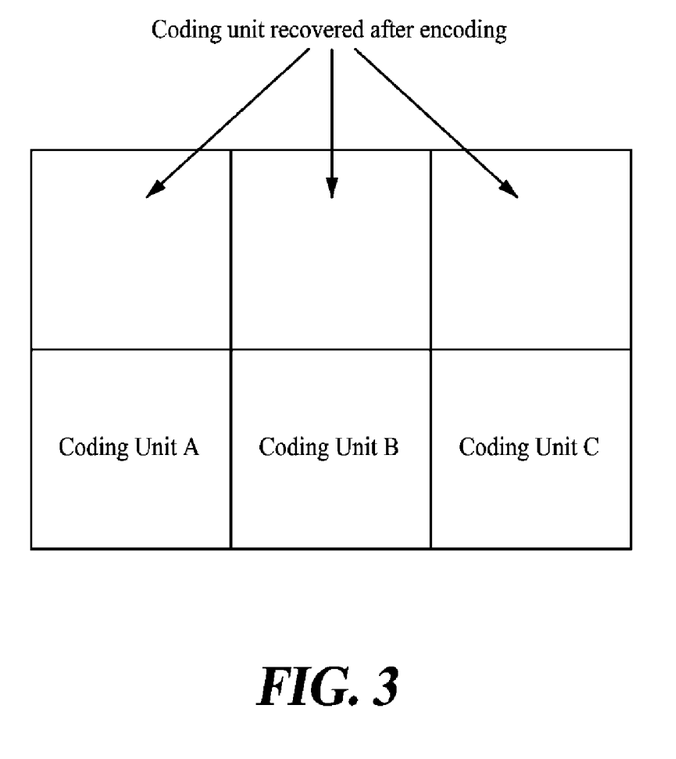
FIG. 3 is a view of a plurality of arranged coding units.

FIG. 3 is a view of a plurality of arranged coding units. The at least one embodiment of the present disclosure is provided to simultaneously perform parallel processing of a plurality of coding units (e.g., coding units A, B and C) as shown in FIG. 3.

Figure 4:
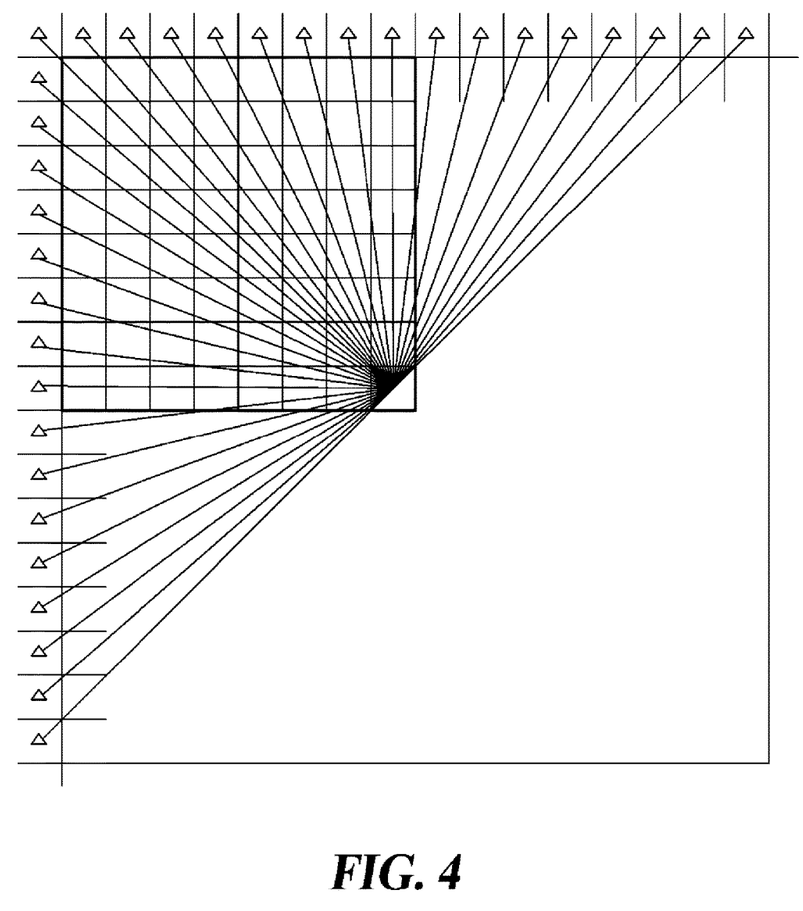
FIG. 4 is a view of intra-prediction directions for prediction at various angles in an 8×8 block.

FIG. 4 is a view of intra-prediction directions for prediction at various angles in an 8×8 block.

As shown in FIG. 4, an upper or left extrapolation pixel of the current block is needed to perform intra prediction in various directions.

In the at least one embodiment of the present disclosure, as information dependency upon the encoding between the coding unit block (or coding unit) in the same row in one frame or one slice is removed, intra prediction and encoding of the plurality of blocks can be performed. In order not to depend information of a neighboring block upon the encoding of the current block, differently from the known intra prediction (for example, see FIGS. 1 and 4) by using encoding information of upper and left blocks of the current coding unit block, in the at least one embodiment of the present disclosure, in a configuration of left extrapolation pixels for extrapolation upon intra prediction, left extrapolation pixels are constituted by pixel information of the lowermost row of blocks disposed at a top left of the current block and partial information of at least one original pixel of the current block (for example, partial pixel information of a left column of the current block) instead of decoded pixel information of the rightmost column of a left block of the current block.

Figure 5:
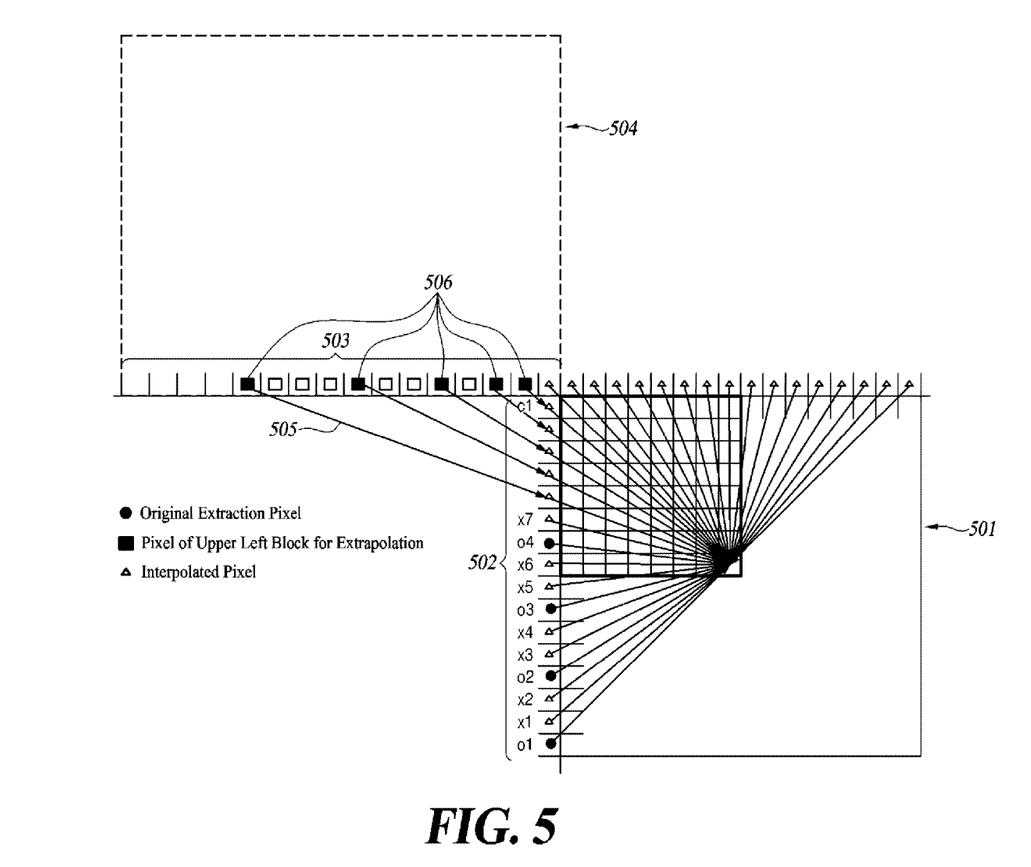
FIG. 5 is a view of an example in which a left extrapolation pixel is configured by using the lowermost pixel of a block disposed at a top left of the current block or a portion of an original pixel of the current block.

FIG. 5 is a view showing an example in which left extrapolation pixels are configured by using the lowermost pixels of a block disposed at the top left side of the current block or a portion of the original pixels of the current block.

As shown in FIG. 5, the left extrapolation pixel generating unit 210 constitutes the left extrapolation pixels required for intra-prediction of the current block (501). The left extrapolation pixel generating unit 210 generates left extrapolation pixels of a corresponding position (i.e., a position corresponding to a point intersecting with the rightmost pixel (502) of a left block of the current block) with values of the lowermost pixels (503) of the top left block (504) when one or more extension lines (505) in a direction of an intra-prediction mode required for intra-prediction of the current block intersects with pixels of the top left block. That is, since the pixels of the top left block may be disposed on one or more extension lines in an extrapolation direction of an intra prediction mode and each of the pixels is pixel on each of one or more extension lines in the same direction as that of the corresponding intra prediction, said each pixel is similar to the corresponding pixel of the rightmost column of the left block of the current block. Accordingly, the lowermost pixels of the top left block of the current block on the corresponding extension lines can be selected with the values of the left extrapolation pixels (506) used upon the intra-prediction.

However, when top left block pixel information does not exist on the one or more extension lines in the extrapolation direction of the intra-prediction mode or the extrapolation prediction direction does not intersect with the top left block, some pixels of the original block (i.e., the current block) may be selected and used as values of the left extrapolation pixels. That is, the number of original pixels may be set to a predetermined number at predetermined intervals according to the number of left extrapolation pixels that do not constitute the pixels of the top left block of the current coding unit.

Here, the original pixels can be selected at predetermined intervals. For example, the lowermost left extrapolation pixel o1 can use the original pixel of the current block, and original pixels of the current block can be extracted at predetermined intervals (for example, three intervals between o1, o2, o3 and o4 as shown in FIG. 5) with the extrapolation pixels disposed upwardly thereof to be used as the left extrapolation pixels. That is, a position at which the original pixels are duplicated and used as the left extrapolation pixels may be previously determined in pixels of the leftmost column of the currently encoded block.

In addition, the values of the left extrapolation pixels of the unselected position except for the values of the left extrapolation pixels of the predetermined position at which the original pixels are extracted can use values obtained by interpolating of pixel values selected from the original pixels of the current block. For example, values of x1 and x2 can be determined by linearly interpolating values of o1 and o2, and a value of x7 can be determined by linearly interpolating values of o4 and c1.

The information of the original pixels used upon the encoding can be transmitted to the video decoding apparatus (to be described below) to be used to reconstruct the compression signal.

The information of the left extrapolation pixel generated by the left extrapolation pixel generating unit 210 can be transmitted to the intra-prediction encoding unit 220 to be used to predict and encode the coding unit, and the information of the original pixels generated by the left extrapolation pixel generating unit 210 can be transmitted to the prediction information encoding unit 230 to be used to encode the prediction information including the information of the original pixels.

Figure 6:
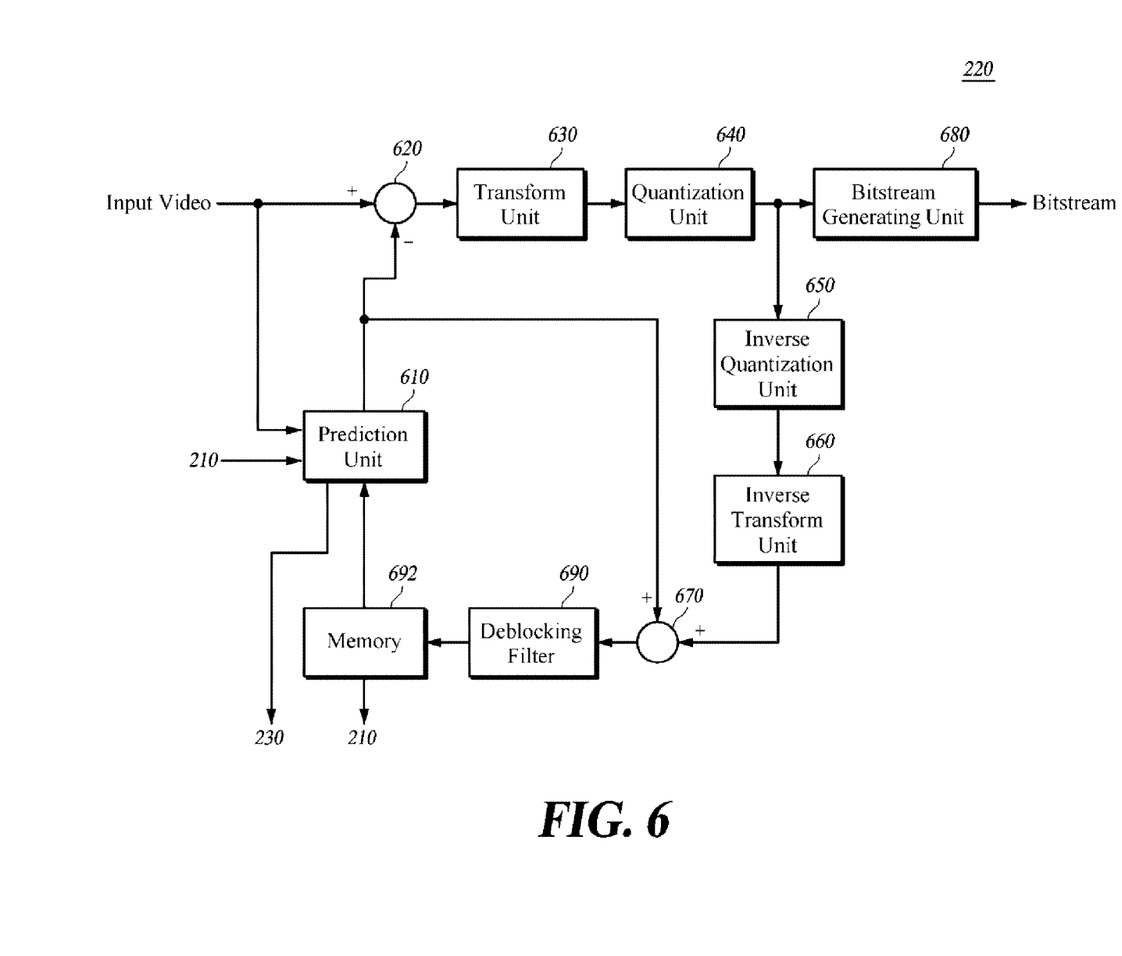
FIG. 6 is a block diagram of an intra-prediction encoding unit according to at least one embodiment of the present disclosure.

As shown in FIG. 6, the intra-prediction encoding unit 220 may include a prediction unit 610, a subtraction unit 620, a transform unit 630, a quantization unit 640, a dequantization unit 650, an inverse transform unit 660, an adder unit 670, a bitstream generating unit 680, a deblocking filter 690 and a memory 692. Some of the above-mentioned components may not be necessarily included, and some or the entire components may be selectively included according to implementations. Other components of the local caching device 220, such as the prediction unit 610, the subtraction unit 620, the transform unit 630, the quantization unit 640, the dequantization unit 650, the inverse transform unit 660, the adder unit 670, the bitstream generating unit 680, and the deblocking filter 690 are implemented by one or more processors and/or application-specific integrated circuits (ASICs).

An input video to be encoded can be input by a block unit, and in the at least one embodiment of the present disclosure, the block may be an M×N type, M and N may have the same magnitude or may be different from each other.

The prediction unit 610 predicts a target block to be currently encoded in the video by using an intra prediction or inter prediction method to generate a prediction block. That is, when the prediction unit 610 performs the intra prediction, the prediction unit 610 predicts a pixel value of each pixel of the target block to be encoded in the video according to a determined optimal prediction mode and generates a prediction block having a prediction pixel value of the predicted pixel. Here, the optimal prediction mode may be determined as a prediction mode having a minimum encoding cost among various intra prediction modes for intra prediction (for example, in H.264/AVC, nine prediction modes in each of the intra 8×8 prediction and the intra 4×4 prediction, and four prediction modes in the intra 16×16 prediction).

For example, in the intra 4×4 prediction as shown in FIG. 1, the nine prediction modes include a vertical mode, a horizontal mode, a direct current (DC) mode, a diagonal down-left mode, a diagonal down-right mode, a vertical right mode, a horizontal-down mode, a vertical-left mode, and a horizontal-up mode. In the intra 4×4 prediction, the prediction unit 610 can calculate the encoding costs of the respective prediction modes of the current block by using pixel values M, A, B, . . . , H of the upper block and left extrapolation pixel values I, J, K and L generated by the left extrapolation pixel generating unit 210, and determine the prediction mode having the minimum encoding cost as an optimal intra-prediction mode to generate a prediction block.

The subtraction unit 620 subtracts the prediction block from the target block (i.e., the current block) to be encoded and generates a residual block. That is, the subtraction unit 620 calculates a difference between a pixel value of each pixel of the target block to be encoded and a prediction pixel value of each pixel of the prediction block predicted by the prediction unit 610, and generates a residual block including a residual signal having a block shape.

The transform unit 630 transforms the residual block into a frequency domain and transforms of each pixel value of the residual block into a frequency parameter. Here, the transform unit 630 can transform the residual signal into the frequency domain by using various transform techniques of transforming an image signal of a spatial axis into a frequency axis such as a Hadamard transform, a discrete cosine transform-based transform (DCT based transform), or the like, and the residual signal transformed into the frequency domain becomes a frequency parameter.

The quantization unit 640 quantizes the residual block having the frequency parameter transformed into the frequency domain by the transform unit 630. Here, quantization unit 640 can quantizes the transformed residual block by using a dead zone uniform threshold quantization (hereinafter, referred to as "DZUTQ"), a quantization weighted matrix, a quantization technique developed by improving the above, or the like.

The bitstream generating unit 680 encodes a quantization frequency parameter column by using an entropy encoding technique or the like to output a bitstream. While the entropy encoding technique can be used as such an encoding technique, the present disclosure is not limited thereto but the other various encoding techniques may be used.

In addition, the bitstream generating unit 680 can include a bit column obtained by encoding the quantization frequency parameter and various information required for decoding the encoded bit column into the encoding data. That is, the encoding data may include a coded block pattern (CBP), a bit column in which a delta quantization parameter and a quantization frequency parameter are encoded, a bit column for information required for prediction, and so on.

The dequantization unit 650 dequantizes the frequency transform block quantized by quantization unit 640. That is, the dequantization unit 650 dequantizes the quantization frequency parameters of the quantized frequency transform block to generate a residual block having a frequency parameter.

The inverse transform unit 660 inversely transforms the frequency transform block dequantized by the dequantization unit 650. That is, the inverse transform unit 660 inversely transforms the frequency parameters of the frequency transform block reconstructed by the dequantization unit 650 to generate the residual block having the pixel value, i.e., the reconstructed residual block. Here, the inverse transform unit 660 can inversely transform by using the transform method used in the transform unit 630.

The adder unit 670 adds the prediction block predicted by the prediction unit 610 and the residual block reconstructed by the inverse transform unit 660 to reconstruct the current block, which is a target block. The reconstructed target block can pass through the deblocking filter 690, the deblocking filter 690 can deblocking-filter the reconstructed current block to remove block distortion or the like, and the memory 692 can store the deblocking-filtered current block to use the block as a reference picture when the following block of the target block or the next block is encoded thereafter.

The prediction information encoding unit 230 encodes prediction information including a prediction mode (i.e., an intra prediction mode) in which intra-prediction is performed. Here, the prediction information may include information of the original pixels constituting the left extrapolation pixels according to the intra-prediction mode in which the prediction block is generated. Here, the information of the original pixels that can be encoded may include values of the selected original pixels.

Meanwhile, when one or more extension lines in a direction of at least one intra-prediction mode does not intersect with a pixel of the top left block of the current block and there is an intra-prediction mode in which a rate-distortion ratio upon the encoding is within a preset value range, the intra-prediction encoding unit 220 may perform the intra-prediction to generate the prediction block in the intra-prediction mode in which the left extrapolation pixel of the current block is not used. Accordingly, in this case, the intra-prediction mode selected when the prediction block is generated is selected as the intra-prediction mode having the most optimal encoding efficiency in the intra-prediction mode in which the rate-distortion ratio is within the preset value range.

Meanwhile, when the prediction block is generated by each of the uppermost coding units and the current block is reconstructed by using the generated prediction block, the intra-prediction encoding unit 220 can perform a secondary prediction by using a reconstructed block value of a left coding unit on the left of the coding unit which is to be currently encoded. That is, the intra-prediction encoding unit 220 can predict the coding unit by using at least one neighboring pixel including left extrapolation pixels generated by the left extrapolation pixel generating unit 210 to primarily generate a prediction block and reconstruct a coding block to be currently encoded, and then, generate at least one left extrapolation pixel by using at least one right pixel value of the reconstructed block of the left coding unit and generate a second prediction block by using at least one neighboring pixel including the generated at least one left extrapolation pixel, encoding the coding unit to be currently encoded by using the second prediction block.

Here, the prediction block used to encode the coding unit to be currently encoded may use one block having an optimal rate-distortion ratio (i.e., lower rate-distortion ratio) between an encoding using a primarily generated prediction block (i.e., referred to as a first prediction block for description convenience) and an encoding using a second prediction block. In addition, the prediction information encoding unit 230 can receive information whether the second prediction block is used and information of the second intra-prediction mode used to generate the second prediction block from the intra-prediction encoding unit 220, and encode at least one information selected from the group consisting of a prediction block flag showing whether the second prediction block is used and a second intra-prediction mode included in the prediction information into a bitstream.

Figure 7:
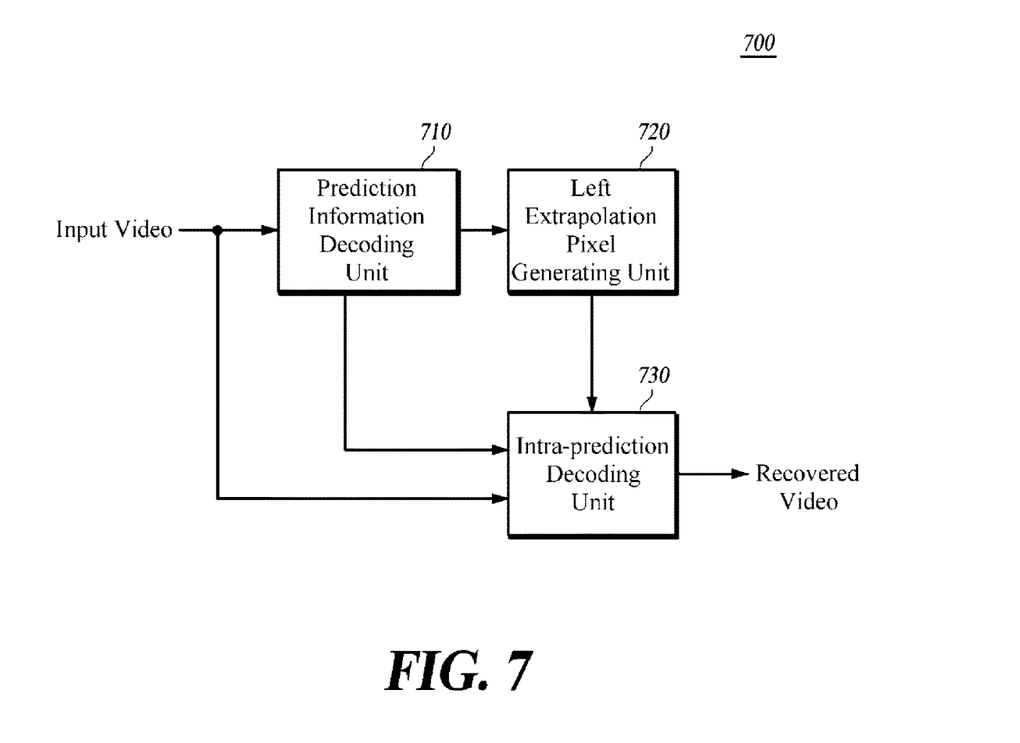
FIG. 7 is a schematic block diagram of a video decoding apparatus according to at least one embodiment of the present disclosure.

FIG. 7 is a block diagram schematically showing a configuration of a video decoding apparatus 700 of at least one embodiment of the present disclosure.

The video decoding apparatus 700 according to the at least one embodiment of the present disclosure includes a prediction information decoding unit 710, a left extrapolation pixel generating unit 720 and an intra-prediction decoding unit 730. Other components of the video decoding apparatus 700, such as the prediction information decoding unit 710, the left extrapolation pixel generating unit 720 and the intra-prediction decoding unit 730 are implemented by one or more processors and/or application-specific integrated circuits (ASICs).

The prediction information decoding unit 710 decodes the prediction information including the intra-prediction mode.

The left extrapolation pixel generating unit 720 generates left extrapolation pixels of the coding unit by using one selected from the group consisting of pixels of the top left block of the coding unit to be reconstructed according to the direction of the decoded intra-prediction mode and the leftmost original pixels of the coding unit included in the prediction information.

The intra-prediction decoding unit 730 generates the prediction block of the coding unit and reconstructs the coding unit by using at least one neighboring pixel of the coding unit according to the decoded intra-prediction mode (i.e., the decoded intra-prediction mode is obtained by decoding the prediction information).

The prediction information decoded by the prediction information decoding unit 710 may include original pixel information constituting the left extrapolation pixels as well as the intra-prediction mode, and may include a prediction block flag showing the used prediction block according to circumstances. In addition, when it is shown that the prediction block flag is predicted to become a second prediction block through the secondary prediction, the decoded prediction information may include information of a second intra-prediction mode.

The left extrapolation pixel generating unit 720 can be operated similarly to the left extrapolation pixel generating unit 210 in using the pixels of the top left block of the current coding unit to be reconstructed of the video encoding apparatus 200 according to the direction of the decoded intra-prediction mode. That is, values of the left extrapolation pixel may be generated as the lowermost pixel values when an extension line of the direction of the decoded intra-prediction mode intersect with the lowermost pixels of the top left block.

In addition, when the left extrapolation pixels are not entirely constituted by the pixels of the top left block of the current coding unit, i.e., when one or more extension lines of a direction of the intra-prediction mode obtained by decoding the prediction information do not intersect with the lowermost pixels of the top left block or when there is no information of the top left block pixels, the values of the left extrapolation pixels can be generated by using the values of the leftmost original pixels included in the decoded prediction information. Here, the number of decoded original pixels can be set to a predetermined number at predetermined intervals according to the number of left extrapolation pixels that are not constituted by the pixels of the top left block of the current coding unit. In addition, here, the values of the left extrapolation pixels at a position t not corresponding to the selected leftmost original pixels of the coding unit can be determined through (obtained by) interpolating values of the selected leftmost original pixels of the coding unit. Since the interpolation method by using the original pixels has been described in the video encoding apparatus 200, detailed description thereof will not be repeated.

The intra-prediction decoding unit 730 generates the prediction block of the coding unit and reconstructs the coding unit by using the neighboring pixel of the coding unit according to the decoded intra-prediction mode.

Figure 8:
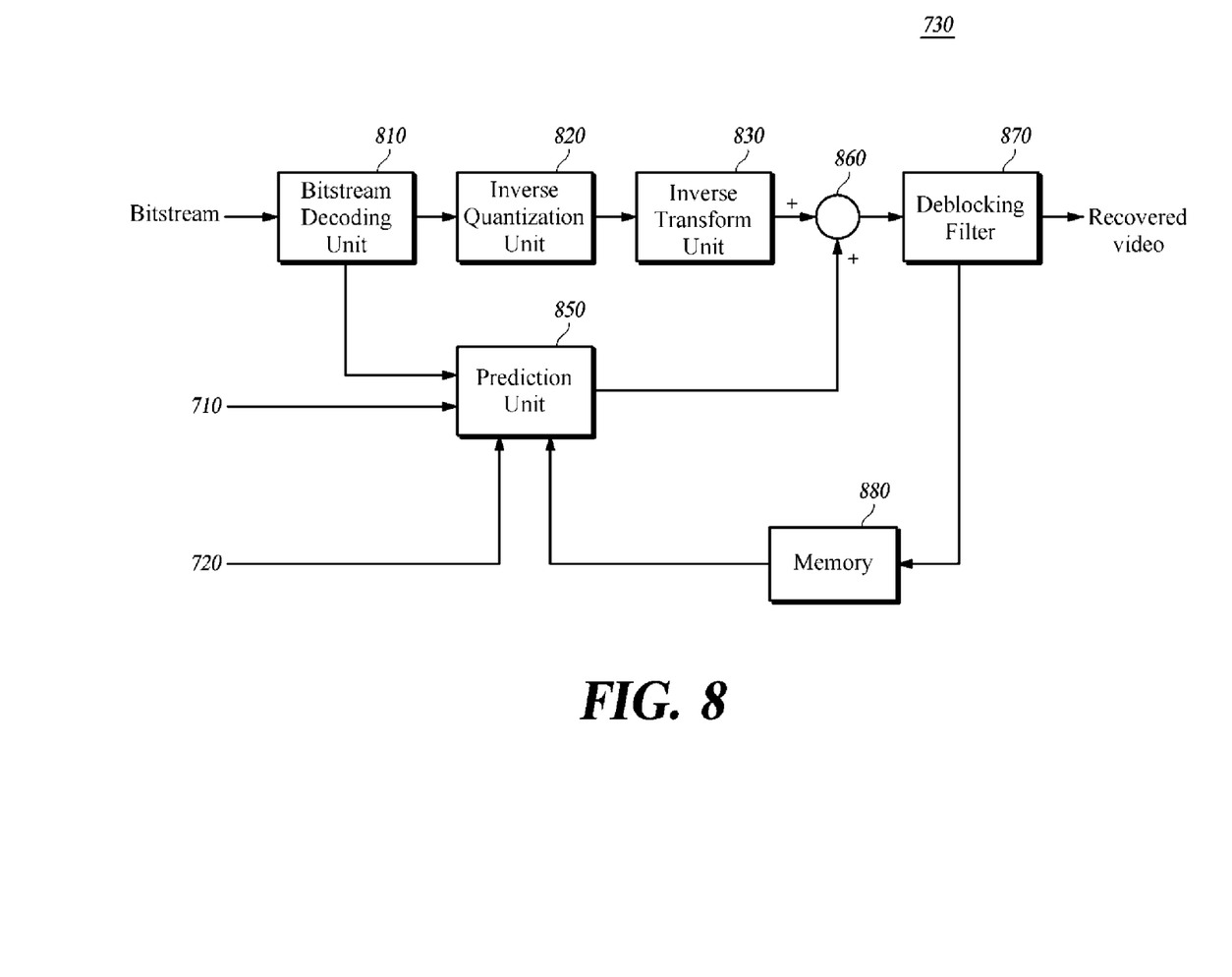
FIG. 8 is a block diagram of an intra-prediction decoding unit according to at least one embodiment of the present disclosure.

As shown in FIG. 8, the intra-prediction decoding unit 730 may include a bitstream decoding unit 810, an dequantization unit 820, an inverse transform unit 830, a prediction unit 850, an adder unit 860, a deblocking filter 870 and a memory 880. Other components of the intra-prediction decoding unit 730, such as the bitstream decoding unit 810, the dequantization unit 820, the inverse transform unit 830, the prediction unit 850, the adder unit 860, and the deblocking filter 870 are implemented by one or more processors and/or application-specific integrated circuits (ASICs).

The bitstream decoding unit 810 can decode the bitstream to extract a quantization frequency parameter column and inversely scan the quantization frequency parameter column to generate a residual block having a quantization frequency parameter.

Since the dequantization unit 820 and the inverse transform unit 830 performs the same or similar function as the dequantization unit 650 and the inverse transform unit 660 described with reference to FIG. 6, detailed description thereof will not be repeated.

The prediction unit 850 generates the prediction block by using information of the neighboring pixels including the left extrapolation pixels and the decoded intra-prediction mode.

The adder unit 860 adds the prediction block generated by the prediction unit 850 and the residual block reconstructed by the inverse transform unit 830 to reconstruct the current block. The reconstructed current block can be deblocking-filtered by the deblocking filter 870, and then, stored in the memory 880 to be used as a reference picture when the next block or the further next block of the target block is reconstructed.

Meanwhile, the decoded prediction information may include a prediction block flag showing a block used to predict the coding unit. Here, when the prediction block flag shows that the second prediction block is used, the intra-prediction decoding unit 730 can intra-predicts the current coding unit and generate a second prediction block by using the reconstructed block of the left coding unit by using the decoded second intra-prediction mode and reconstruct the coding unit to be currently reconstructed by using the second prediction block.

The video encoding/decoding apparatus according to the at least one embodiment of the present disclosure can be implemented by connecting a bitstream output terminal of the video encoding apparatus 200 of FIG. 2 to a bitstream input terminal of the video decoding apparatus 700 of FIG. 7.

The video encoding/decoding apparatus according to the at least one embodiment of the present disclosure includes a video encoder configured to generate left extrapolation pixels of the coding unit by using one selected from the group consisting of pixels of a top left block of the coding unit and the leftmost original pixels of the coding unit according to a direction of the intra-prediction mode with respect to the coding unit, and predict the coding unit by using the neighboring pixels including the left extrapolation pixels to generate a prediction block and encode the coding unit; and a video decoder configured to decode prediction information including an intra-prediction mode, generate left extrapolation pixels of the coding unit by using pixels of a top left block of the coding unit to be reconstructed according to a direction of the decoded intra-prediction mode or values of the leftmost original pixels of the coding unit included in the prediction information, generate a prediction block of the coding unit by using neighboring pixels of the coding unit according to the decoded intra-prediction mode, and reconstruct the coding unit.

Here, the video encoder can be implemented by the video encoding apparatus 200 according to the at least one embodiment of the present disclosure, and the video decoder can be implemented by the video decoding apparatus 700 according to the at least one embodiment of the present disclosure.

Figure 9:
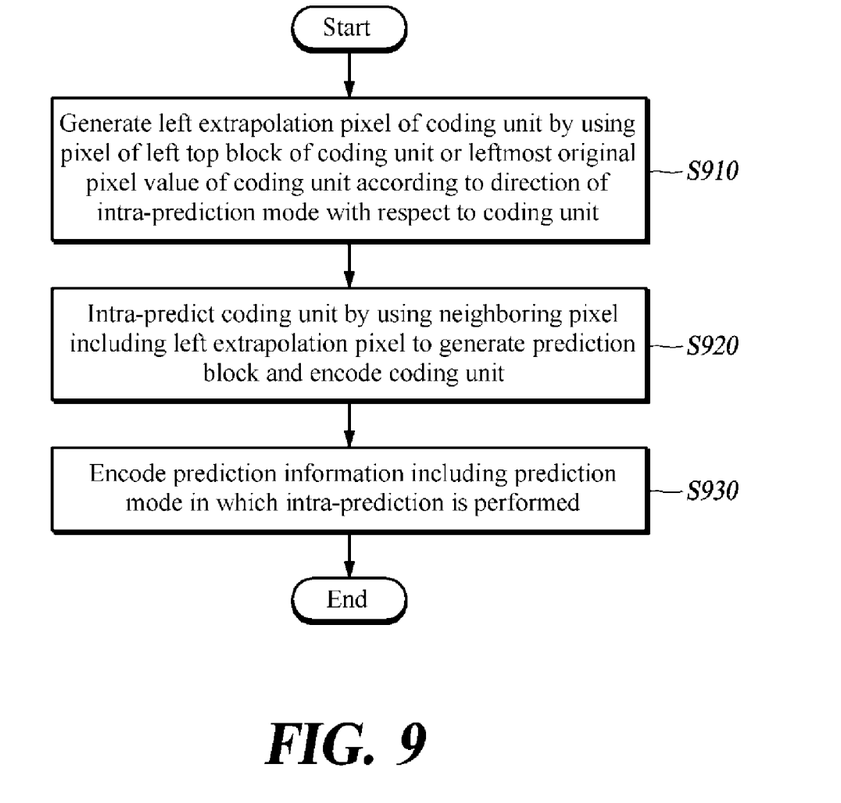
FIG. 9 is a flowchart of a video encoding method according to at least one embodiment of the present disclosure.

FIG. 9 is a flowchart of a video encoding method according to the at least one embodiment of the present disclosure.

The video encoding method according to the at least one embodiment of the present disclosure includes a left extrapolation pixel generating step (S910) of generating a left extrapolation pixel of the coding unit by using at least one of pixels of a top left block of the coding unit and the leftmost original pixels of the coding unit according to a direction of an intra-prediction mode of the coding unit, an intra-prediction encoding step (S920) of intra-predicting the coding unit by using neighboring pixels including left extrapolation pixels to generate a prediction block and encode the coding unit, and a prediction information encoding step (S930) of encoding prediction information including a prediction mode in which intra-prediction is performed.

Here, since the left extrapolation pixel generating step (S910) may correspond to an operation of the left extrapolation pixel generating unit 210, the intra-prediction encoding step (S920) may correspond to an operation of the intra-prediction encoding unit 220 and the prediction information encoding step (S930) may correspond to an operation of the prediction information encoding unit 230, detailed description thereof will not be repeated.

Figure 10:
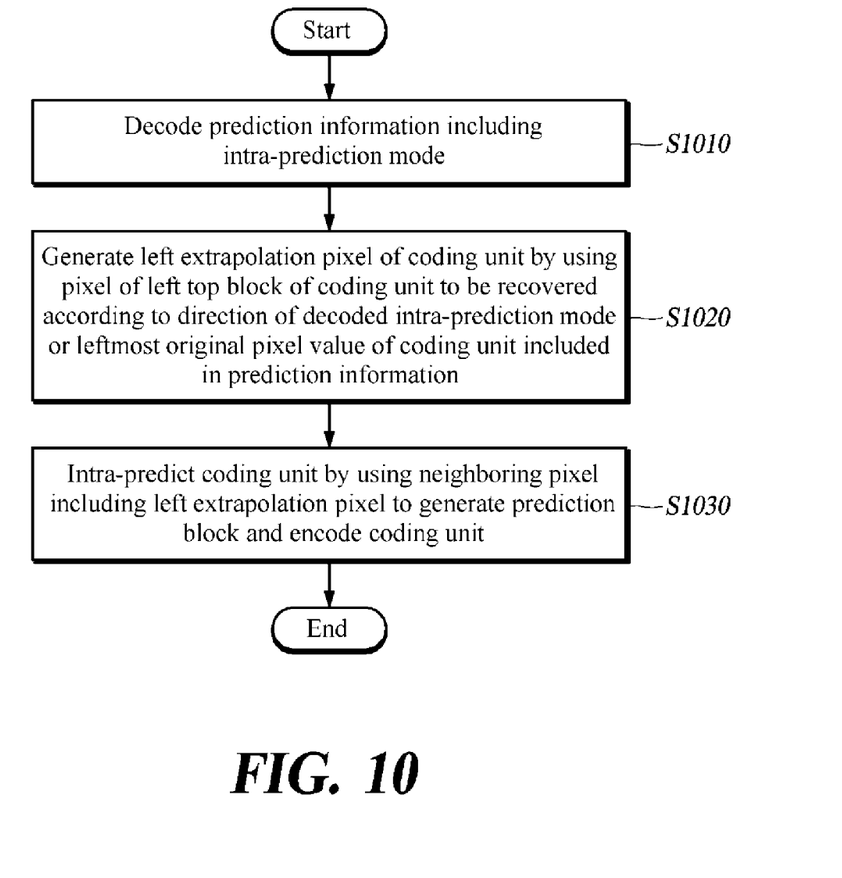
FIG. 10 is a flowchart of a video decoding method according to at least one embodiment of the present disclosure.

FIG. 10 is a flowchart of a video decoding method according to the at least one embodiment of the present disclosure.

The video decoding method according to the at least one embodiment of the present disclosure includes a prediction information decoding step (S1010) of decoding prediction information including an intra-prediction mode, a left extrapolation pixel generating step (S1020) of generating left extrapolation pixels of a coding unit by at least one of using pixels of a top left block of the coding unit to be reconstructed according to a direction of the decoded intra-prediction mode and the leftmost original pixels of the coding unit included in prediction information, and an intra-prediction decoding step (S1030) of generating a prediction block of the coding unit and reconstructing the coding unit by using neighboring pixels of the coding unit according to the decoded intra-prediction mode.

Here, since the prediction information decoding step (S1010) may correspond to an operation of the prediction information decoding unit 710, the left extrapolation pixel generating step (S1020) may correspond to an operation of the left extrapolation pixel generating unit 720 and the intra-prediction decoding step (S1030) may correspond to an operation of the intra-prediction decoding unit 730, detailed description thereof will not be repeated.

A video encoding/decoding method according to the at least one embodiment of the present disclosure may be implemented by combining the video encoding method according to the at least one embodiment of the present disclosure and the video decoding method according to the at least one embodiment of the present disclosure.

The video encoding/decoding method according to the at least one embodiment of the present disclosure includes a video encoding step of generating a left extrapolation pixel of the coding unit by using at least one of pixels of a top left block of the coding unit according to a direction of an intra-prediction mode of the coding unit and the leftmost original pixels of the coding unit and intra-predicting the coding unit by using a neighboring pixel including the left extrapolation pixels to generate a prediction block and encode the coding unit; and a video decoding step of decoding prediction information including an intra-prediction mode, generating left extrapolation pixels of the coding unit by using at least one of pixels of a top left block of the coding unit to be reconstructed according to a direction of the decoded intra-prediction mode and the leftmost original pixels of the coding unit coding included in the prediction information, and generating a prediction block of the coding unit and reconstructing the coding unit by using neighboring pixels of the coding unit according to the decoded intra-prediction mode.

As described above, according to the at least one embodiment of the present invention, a higher speed video encoding apparatus and video decoding apparatus can be implemented by improving parallelism of video data compression and reconstruction techniques to simultaneously perform intra prediction coding of a plurality of coding unit blocks by utilizing partial pixel data of the original data and previously reconstructed block pixel information. In addition, when a rate-distortion ratio encoded in an intra-prediction mode by using only an upper neighboring pixel of the uppermost coding unit is within a preset value range, the video encoding and decoding can be dispensed with the original left pixel to relieve transmission of the original pixel used in intra-prediction, and thereby parallelize the encoding and decoding and achieve an acceptable coding efficiency at the same time.

As described above, according to the at least one embodiment of the present disclosure, as the intra prediction coding of a plurality of coding unit blocks is simultaneously performed by utilizing partial pixel data of the original pixel and the previously reconstructed block pixel information, parallelism of a video data compression and reconstruction technique is improved to implement the video encoding apparatus and the video decoding apparatus having a higher speed.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality. Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, the scope of the claimed invention is not limited by the explicitly described above embodiments but by the claims and equivalents thereof.

The invention claimed is:

1. A video encoding apparatus, comprising:
   a left extrapolation pixel generating unit configured to
      select a pixel of a top left block of a coding unit to be encoded, the selection being based on a direction corresponding to an intra-prediction mode of the coding unit, the top left block being located at an upper left position from the coding unit, and
      generate one or more left extrapolation pixels to be used for an intra prediction of a target pixel within the coding unit, the target pixel being a pixel to be encoded, the generation being performed by using the pixel of the to left block;
   an intra-prediction encoding unit configured to predict, according to the intra-prediction mode, the coding unit by using neighboring pixels including the left extrapolation pixels to generate a first prediction block to thereby encode the coding unit, the neighboring pixels being adjacent to the coding unit; and
   a prediction information encoding unit configured to encode prediction information including the intra-prediction mode,
   wherein the left extrapolation pixels are located in a column nearest from leftmost pixels of the coding unit and located between the pixel of the top left block and the target pixel,
   wherein the pixel of the top left block is located vertically different from the left extrapolation pixels,
   wherein the left extrapolation pixels are located in an extension line which connects, in the direction, the pixel of the top left block and the target pixel.

2. The video encoding apparatus of claim 1, wherein values of the left extrapolation pixels are generated as values of lowermost pixels of the top left block.

3. The video encoding apparatus of claim 1, wherein values of the left extrapolation pixels are generated by using the leftmost original pixels of the coding unit, when the extension line does not intersect with the lowermost pixels of the top left block or when the top left block doesn't exist.

4. The video encoding apparatus of claim 3, wherein the leftmost original pixels are selected at preset intervals within the coding unit for generating the left extrapolation pixels.

5. The video encoding apparatus of claim 4, wherein the values of the left extrapolation pixels are obtained by interpolating the values of the selected leftmost original pixels of the coding unit.

6. The video encoding apparatus of claim 1, wherein the intra-prediction encoding unit is configured to
   generate the first prediction block and generate a second prediction block of the coding unit by using a left coding unit located on the left of the coding unit, and
   encode the coding unit by using one of the first and the second prediction block.

7. The video encoding apparatus of claim 6, wherein the prediction information comprises at least one selected from the group consisting of
   a prediction block flag representing whether the second prediction block is used to predict the coding unit, and
   a second intra-prediction mode used to generate the second prediction block.

8. A video decoding apparatus, comprising:
   a prediction information decoding unit configured to decode prediction information including an intra-prediction mode of a coding unit to be reconstructed;
   a left extrapolation pixel generating unit configured to
      select a pixel of a top left block of the coding unit, the selection being based on a direction corresponding to the intra-prediction mode, the top left block being located at an upper left position from the coding unit, and
      generate one or more left extrapolation pixels to be used for an intra prediction of a target pixel within the coding unit, the target pixel being a pixel to be decoded, the generation being performed by using the pixels of the top left block; and
   an intra-prediction decoding unit configured to reconstruct the coding unit by
      generating, according to the intra-prediction mode, a first prediction block of the coding unit by using neighboring pixels including the left extrapolation pixel, the neighboring pixels being adjacent to the coding unit,
   wherein the left extrapolation pixels are located in a column nearest from leftmost pixels of the coding unit and located between the pixel of the top left block and the target pixel,
   wherein the pixel of the top left block is located vertically different from the left extrapolation pixels,
   wherein the left extrapolation pixels are located in an extension line which connects, in the direction, the pixel of the top left block and the target pixel.

9. The video decoding apparatus of claim 8, wherein values of the left extrapolation pixels are generated as values of lowermost pixels of the top left block.

10. The video decoding apparatus of claim 8, wherein values of the left extrapolation pixels are generated by using the leftmost original pixels, when the extension line does not intersect with the lowermost pixels of the top left block or when the top left block does not exist.

11. The video decoding apparatus of claim 10, wherein the leftmost original pixels are selected at preset intervals within the coding unit for generating the left extrapolation pixels.

12. The video decoding apparatus of claim 11, wherein the values of the left extrapolation pixels are obtained by interpolating the values of the selected leftmost original pixels of the coding unit.

13. The video decoding apparatus of claim 8, wherein the prediction information includes at least one of a prediction block flag and a second intra-prediction mode, wherein the prediction block flag represents whether a second prediction block is used to predict the coding unit, and the second intra-prediction mode is used to generate the second prediction block.

14. The video decoding apparatus of claim 13, wherein, when the prediction block flag represents that the second prediction block is used to predict the coding unit, the intra-prediction decoding unit is configured to generate the second prediction block by using a left coding unit located on the left of the current coding unit according to the second intra-prediction mode, and reconstruct the current coding unit by using the second prediction block.

15. A video decoding method performed by a video decoding apparatus, the method comprising:
   decoding prediction information including an intra-prediction mode of a coding unit to be reconstructed;
   selecting a pixel of a top left block of the coding unit, the selection being based on a direction corresponding to the intra-prediction mode, the top left block being located at an upper left position from the coding unit;

generating one or more left extrapolation pixels to be used for an intra prediction of a target pixel within the coding unit, the target pixel being a pixel to be decoded, the generation being performed by using the pixels of the top left block; and reconstructing the coding unit by generating, according to the intra-prediction mode, a first prediction block of the coding unit by using neighboring pixels including the left extrapolation pixel, the neighboring pixels being adjacent to the coding unit, wherein the left extrapolation pixels are located in a column nearest from leftmost pixels of the coding unit and located between the pixel of the top left block and the target pixel, wherein the pixel of the top left block is located vertically different from the left extrapolation pixels, wherein the left extrapolation pixels are located in an extension line which connects, in the direction, the pixel of the top left block and the target pixel.

16. The video decoding method of claim 15, wherein values of the left extrapolation pixels are generated as values of lowermost pixels of the top left block.

17. The video decoding method of claim 15, wherein values of the left extrapolation pixels are generated by using the leftmost original pixels, when the extension line does not intersect with the lowermost pixels of the top left block or the top left block does not exist.

18. The video decoding method of claim 17, wherein the leftmost original pixels are selected at preset intervals within the coding unit for generating the left extrapolation pixels.

19. The video decoding method of claim 18, wherein the values of the left extrapolation pixels are obtained by interpolating the values of the leftmost original pixels of the coding unit.

20. The video decoding method of claim 15, wherein the prediction information includes at least one of a prediction block flag and a second intra-prediction mode, wherein the prediction block flag represents whether a second prediction block is used to predict the coding unit, and the second intra-prediction mode is used to generate the second prediction block.

21. The video decoding method of claim 20, wherein the generating comprising:

when the prediction block flag represents that the second prediction block is used to predict the coding unit, generating the second prediction block by using a left coding unit located on the left of the current coding unit according to the second intra-prediction mode, and reconstructing the coding unit by using the second prediction block.

\* \* \* \* \*